United States Patent [19]

Oberly et al.

[11] Patent Number: 4,739,200
[45] Date of Patent: Apr. 19, 1988

[54] CRYOGENIC WOUND ROTOR FOR LIGHTWEIGHT, HIGH VOLTAGE GENERATORS

[75] Inventors: Charles E. Oberly, Urbana, Ohio; Rex L. Schlicher, Albuquerque, N. Mex.

[73] Assignee: The United States of America as represented by the Secretary of the Air Force, Washington, D.C.

[21] Appl. No.: 855,047

[22] Filed: Apr. 23, 1986

[51] Int. Cl.$^4$ .............................................. H02K 9/00
[52] U.S. Cl. .................................. 310/10; 310/40 R; 310/52; 174/126 S
[58] Field of Search ................... 310/52, 10, 40, 208, 310/55, 201; 174/126 S, 128 S, 126 R; 336/DIG. 1; 335/215, 300

[56] References Cited

U.S. PATENT DOCUMENTS

| | | | |
|---|---|---|---|
| 3,368,087 | 2/1968 | Madsen | 310/10 |
| 3,720,777 | 3/1973 | Sampson et al. | 174/15 C |
| 3,748,615 | 7/1973 | Bogner et al. | 336/60 |
| 3,778,895 | 12/1973 | Nomura et al. | 29/599 |
| 3,890,701 | 6/1975 | Diepers | 29/599 |
| 3,991,333 | 11/1976 | Laskaris | 310/52 |
| 4,126,798 | 11/1978 | Carr, Jr. et al. | 310/52 X |
| 4,242,536 | 12/1980 | Young | 174/128 S |
| 4,342,932 | 8/1982 | Glebov et al. | 310/52 |
| 4,384,168 | 5/1983 | Kenney | 174/126 S |
| 4,529,955 | 7/1985 | Schuster et al. | 335/300 |

Primary Examiner—Donovan F. Duggan
Attorney, Agent, or Firm—Donald J. Singer; Bernard E. Franz

[57] ABSTRACT

Liquid hydrogen is used to completely cool all elements of the generator including bearings, stator conductor, rotor conductor, magnetic flux shield, and excitation mechanisms. By essentially immersing the generator in liquid hydrogen, cryogenic interface problems are minimized. The conductor windings will utilize pure metals such as aluminum to minimize the weight and the ohmic heat loss in the machine. Complications of liquid helium cooling for superconducting windings and quench phenomena due to thermal instabilities in the superconductors are eliminated. The use of extremely low resistance of liquid hydrogen cooled aluminum permits heat removal in the confined space of the rotor field winding at magnetic field and current density that can exceed that of superconductors. Because iron is not required in the generator, very high voltages can be generated.

5 Claims, 3 Drawing Sheets

CRYOGENIC WOUND ROTOR FOR LIGHTWEIGHT, HIGH VOLTAGE GENERATORS

RIGHTS OF THE GOVERNMENT

The invention described herein may be manufactured and used by or for the Government of the United States for all governmental purposes without the payment of any royalty.

BACKGROUND OF THE INVENTION

This invention relates to a cryogenic wound rotor designed for lightweight, high-voltage generators.

Aerospace power requirements dictate direct generation of high voltage alternating current at high power levels in lightweight rotating machines. Some prior work toward providing such a generator has used superconductor-wound rotors operating at a liquid helium temperature.

U.S. Patents of interest include U.S. Pat. No. 3,720,777 to Sampson et al, U.S. Pat. No. 3,748,615 to Bogner et al, U.S. Pat. No. 3,778,895 to Nomura et al, U.S. Pat. No. 3,890,701 to Diepers, U.S. Pat. No. 4,384,168 to Kenney, and U.S. Pat. No. 4,529,955 to Schuster et al.

Kenney discloses a conductor for a fluid-cooled winding. While the patent is concerned primarily with superconductors it mentions conductors formed solely of normally conducting materials, such as copper, aluminum, etc., which are used in fluid-cooled motors, generators, transformers and the like. In FIG. 4 the Kenney patent shows substantially rectangular cross section conductors 5 spaced by flow channels, and strips of insulation 9 wound between turns. Nomura et al show in graph form the resistivity of substantially pure aluminum at liquid helium and liquid hydrogen temperatures. Diepers suggests a composite conductor having an aluminum core. Sampson et al show in FIG. 5 a low loss transmission line comprising parallel flat ribbons spaced by insulation 35. Cooling is illustrated in FIG. 4 of this patent. Cooling channels in a superconducting magnet coil are illustrated at 4 in Bogner et al. In Schuster et al cooling is applied to magnetic coils wherein the material of the turns is not specified and presumably not necessarily superconducting.

SUMMARY OF THE INVENTION

An object of the invention is to provide a means of generating high voltage and high power in the lightest possible generator configuration. The high power generator is required for aerospace power applications where hydrogen driven turbines are being considered for prime movers.

This invention relates to an electrical generator with pure aluminum windings and shields that reduce weight by 30 percent over more exotic superconductor designs. The aluminum wound rotor utilizes the higher cryogenic temperature of liquid hydrogen at 21° K. as conductor coolant at which temperature high-purity aluminum has 1/500th its room temperature resistance. A rotor coil comprises twenty turns of multiple filaments of small diameter bonded together to form a flat conductor geometry in an AL-Ce-Fe matrix. Insulator spacers between conductors form liquid hydrogen flow through channels. The use of the extremely low resistance of cryogenic hydrogen cooled aluminum permits heat removal in the confined space of the rotor field winding at magnetic field and current density levels that can exceed that of superconductors. Because iron is not required in the generator, very high voltages can be produced.

Features of the invention include:

(1) Selection of high purity aluminum for rotor and stator windings allows very lightweight, high current density conductors.

(2) External electromagnetic shields can be made of cryogenic aluminum which can be very thin because of the long magnetic diffusion time constant associated with pure aluminum.

(3) Hydrogen cooled and lubricated bearings permit minimal connection points between the cryogenic region and the outside environment.

(4) Shaft mounted excitation eliminates field winding down leads.

(5) Gap distance is minimized because armature shield on winding is not required.

This generator concept eliminates the need for superconductors and liquid helium in lightweight, high voltage power generators. Although detailed designs are not complete, the hydrogen cooled generator with pure aluminum windings and shields can reduce weight by 30% over more exotic superconductor designs.

DETAILED DESCRIPTION

Introduction

Figure 1:
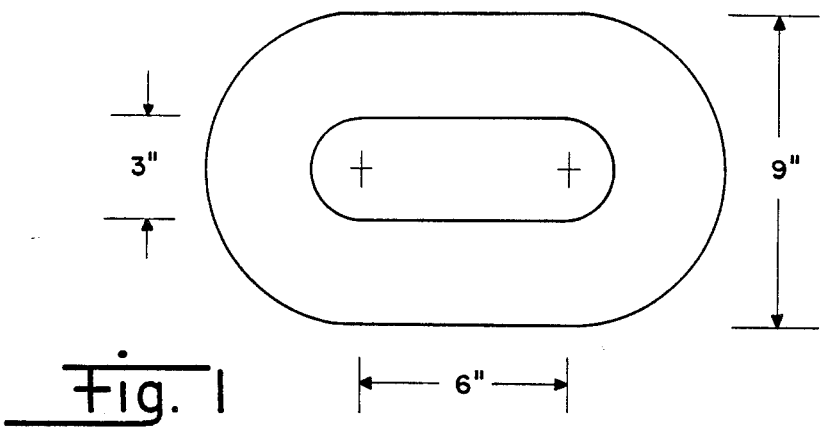
FIG. 1 is diagram showing the dimensions of a coil for a rotor.

For use in aerospace applications, there are two distinct advantages that the aluminum-wound rotor would have over the superconductor-wound rotor. Foremost of these is conductor stability. In the aluminum-wound coil, there would not be the danger that is inherent in the risk of a superconductor coil going "normal", that is, suddenly becoming non-superconducting. When this happens, the liquid helium coolant in the rotor assembly suddenly changes to helium gas which causes a long delay in the thermal recovery of superconductivity and risks damaging the generator rotor. The second of these advantages is in the area of weight. The mass of the alloying metals that constitute the superconductor wire used in a superconducting rotor coil is more than twice that of the equivalent aluminum conductor wire.

To be competitive, the candidate aluminum wire for this alternative rotor design needs to be highly conductive at the temperature range around 21° K. The most likely aluminum conductor would be a composite containing filaments of high-purity aluminum, which at the cryogenic temperature of liquid hydrogen has a resistivity 1/500th the value of its room temperature resistivity.

Hence, the best conductor candidate for this rotor design would be cryogenic hydrogen cooled aluminum.

The system incorporating the invention utilizes externally supplied liquid hydrogen to completely cool all elements of the generator including bearings, stator conductor, rotor conductor, magnetic flux shield, and excitation mechanisms. By essentially immersing the generator in liquid hydrogen, cryogenic interface problems are minimized. At high rotational speeds the hydrogen may become supercritical in the rotor at a given radius. The conductor windings will utilize pure metals such as aluminum to minimize the weight and the ohmic heat loss in the machine. Complications of liquid helium cooling for superconducting windings and quench phenomena due to thermal instabilities in the superconductors are eliminated. The use of extremely low resistance of cryogenic hydrogen cooled aluminum permits heat removal in the confined space of the rotor field winding at magnetic field and current density that can exceed that of superconductors. Because iron is not required in the generator, very high voltages can be generated.

An electrical design is described herein for a cryogenic hydrogen cooled generator rotor that could be used to fabricate a 20 megawatt cryogenic generator. The armature of a 20 megawatt superconducting generator which is available at the Aero-Propulsion Laboratory of the Air Force Wright Aeronautical Laboratories (AFWAL) at the Wright-Patterson Air Force Base can be utilized in this new cryogenic generator concept without electrical modification and with minimum modification to its housing. Because of the acquisition and operating expense of helium liquefiers, the refrigeration requirements at 4° K. and the thermal instability of a superconductor-wound generator rotor, an aluminum-wound rotor is a viable alternative. Ideally, the aluminum-wound rotor could utilize the higher cryogenic temperatures of liquid hydrogen at 21° K. as conductor coolant and not require the complicated thermal management techniques of a superconductor-wound generator rotor. A most likely conductor candidate is high-purity aluminum which has 1/500th its room temperature resistance at liquid hydrogen temperatures. Recent research led by Dr. James C. Ho from Wichita State University has indicated the feasibility of fabricating high-purity aluminum conductors in a composite conductor form; as described in a copending U.S. patent application Ser. No. 849,989, filed Apr. 10, 1986, by C. E. Oberly et al. The invention is also disclosed in papers by J. C. Ho, C. E. Oberly, H. L. Gegel, W. T. O'Hara, J. T. Morgan, Y. V. R. K. Prasad, and W. M. Griffith, presented at the 5th IEEE Pulsed Power Conference, June 10–12, 1985, Arlington, VA; at the International Cryogenics Conference, MIT, Cambridge, MA, Aug. 12–16, 1985; and at the 3rd Symposium on Space Nuclear Power Systems, Jan. 13–16, 1986, Albuquerque, NM. The patent application and papers are hereby incorporated by reference.

Selection of a Reasonable Rotor Design

The significant characteristics of a rotor design are described herein. The emphasis is on the electrical design of the rotor and a general description of its physical characteristics. Because of the physical constraints imposed by using the 20 megawatt generator armature and housing, the overall approach is to substitute a highly conducting aluminum-wound coil for the superconducting niobium-tin wound coil and utilize cryogenic hydrogen flow-through to cool the rotor windings instead of liquid helium coolant. Consequently, the overall dimensions of the aluminum wound rotor would be essentially the same as the superconducting rotor. Table 1 and FIG. 1 illustrate these dimensions.

TABLE 1

| 20 MW Superconductor Rotor Parameters | | |
|---|---|---|
| Number of Coils (Poles) | | 4 |
| Number of Turns/coil | | 980 turns |
| Amount of Current/coil | | 860 amps |
| Dimensions of Coil (Racetrack module): | | |
| | English | Metric |
| Cross section | 3 in × 3 in | 7.62 cm × 7.62 cm |
| Active Length | 6 in | 15.24 cm |
| Inside width | 3 in | 7.62 cm |
| Outside width | 9 in | 22.86 cm |
| Inside bend radius | 1.5 in | 3.81 cm |
| Outside bend radius | 4.5 in | 11.43 cm |

Design of the Aluminum Wound Coils

Figure 2:
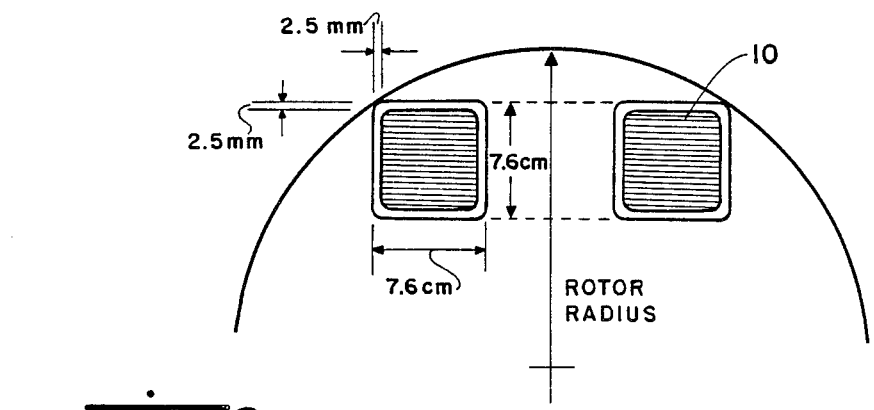
FIG. 2 is a diagram showing the cross section oa a selected coil geometry.

Because of the physical constraints of the selected armature and housing, the overall physical dimensions of the aluminum-wound rotor coils will have to be less than or equal to the overall physical dimensions of the superconducting rotor coils. Hence, an aluminum-wound coil will have to be designed to fit in the conductor slot of the superconducting rotor coil. A cross section of one pole of this slot geometry is illustrated in FIG. 2. The implication of this assumption is that the current density of the aluminum conductor will equal or exceed that of the superconductor.

To simplify coil design and construction, a twenty-turn coil 10 (FIG. 3) of flat conductor geometry has been selected for this design. This provides maximum surface area for thermal heat transfer of the ohmic generated heat to the cryogenic hydrogen coolant as well as providing sufficient passageways for the hydrogen coolant. The number twenty represents the maximum number of turns for a conductor with a large cross section that would still allow sufficient room for coolant. The flat conductor itself would consist of multiple filaments of small diameter bonded together to form the flat conductor geometry in an Al-Ce-Fe matrix.

In determining the dimensions of the conductor, assume that 35% of the coil module cross section must be allowed for structural support material and coolant passage space (see FIG. 2). The high-purity aluminum must be encased in a structural support material to maintain its properties and in order to prevent strains in excess of 0.1% on the pure aluminum filaments. Also, a gap of 2.5 mm is assumed to separate the coil module from the slot walls. This gap provides room for spacers, coolant passages, and side insulation. Thus the calculated net conductor cross section per turn is $$37.74 \text{ cm}^2/20 \text{ turns} = 1.89 \text{ cm}^2/\text{turn}$$

The conductor width is selected to be 7.12 cm with a thickness of 0.27 cm.

Figure 3:
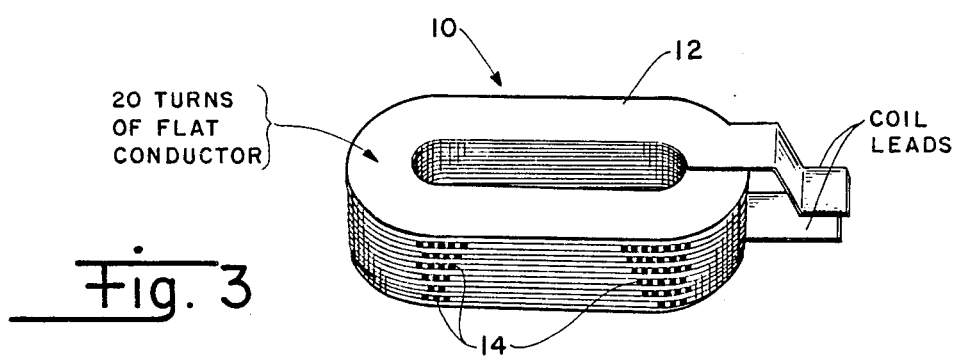
FIG. 3 is a three-dimensional view of the coil design.

A three-dimensional view of a coil 10 is shown in FIG. 3.

Composite Aluminum Conductors

Except for its high conductivity at cryogenic temperatures, the other properties of high-purity aluminum render it wholly inadequate for use in the rotor coils of a high power alternator. In the annealed high-purity state, aluminum is too weak mechanically (typically 1 ksi yield strength) to withstand the internal mechanical stresses induced by the centrifugal forces of rotation and by the back MMf of the stator under load. Furthermore, high-purity aluminum work-hardens, thereby lowering its conductivity. Embedding high-purity aluminum in a high strength matrix is a solution to these shortcomings.

Fabrication of a high-purity aluminum composite conductor requires that the matrix material have a workability that is compatible with aluminum and have practically a zero impurity diffusion from the matrix into the high-purity aluminum filaments. A feasibility study and experiment completed at the Air Force Wright Aeronautical Laboratories indicates that such a composite can now be fabricated.

Determining Ohmic Losses of a Single Coil

For this design, it was assumed that high-purity aluminum would be used as the filaments in an aluminum composite conductor with properties which have just been determined. If it is assumed that the resistivity ratio of this alloy at 21° K. is equal to 500, then the estimated cryogenic electrical resistivity of the alloy is assumed to be $5.6 \times 10^{-9}$ ohm-cm.

Since the primary concern at this time is the steady state operation of the rotor coils, the following simple relation is used to calculate the net ohmic resistance of a single cell.

Conductor Electrical Resistance—$Lp/A$ where
L=conductor length
p=electrical resistivity
A=conductor cross section.

Referring to FIG. 1 as a guide, the net conductor length per turn is calculated to be 78.36 cm. Multiplying this result by 20 turns and adding 30.48 cm (12 inches) for the total length of the down leads provides the net conductor length per coil, and knowing the resistivity and the conductor cross section, the steady state ohmic resistance of a single coil can now be estimated to be equal to $4.73 \times 10^{-6}$ ohms.

Determining the Net Ohmic Power Dissipated in the Rotor

Since the basic magnetic geometry of the cryogenic aluminum wound rotor is to be the same as the superconductor rotor and since there is no ferromagnetic material in the magnetic circuit of the generator, the magnetomotive force (MMF) to generate the rotor magnetic field would be the same as in the superconductor rotor coils.

MMF/coil (superconductor rotor) = 860 amps × 940 turns
= 808,400 ampere-turns

Thus, the net current drawn per aluminum-wound coil becomes:

808,400 ampere-turns/20 turns per coil=40,420 amps/coil

Using the power relationship $P_c = I^2R$ watts for steady state DC operation, we have the net power dissipated per coil.

$P_c$ = (40,420 amps)$^2$ × 4.73 × 10$^{-6}$ ohms
= 7.73 × 10$^3$ watts per coil Since there are four coils in the rotor, the net power dissipated in the rotor $P_r$ becomes:

$P_r$ = 4, × 7.73 × 10$^3$ watts per coil
= 3.09 × 10$^4$ watts
= 30,900 watts

Since the coils are to be connected in series and the down leads are relatively short compared to the coil conductor length, ohmic losses in the down leads were ignored. Ohmic losses in the exciter circuit will be discussed later.

Determining the Conductor Heat Load

Figure 4:
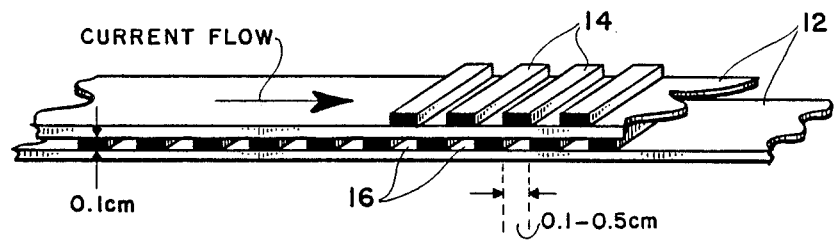
FIG. 4 is a pictorial diagram showing a simple conductor-insulator matrix with radial flow-through coolant channels.

Because of its simplicity, the arrangement outlined in FIG. 4 was selected. Strips of insulating material 14 are alternately laid across the width of the flat conductor 12 between each turn to form a coolant channels 16 for the cross-flow of hydrogen. The spacers 14 and the channels 16 have the same cross section. The width of the strips would depend upon the total number of strips and the total conductor area exposed to the liquid hydrogen. From our preliminary analysis and previous experience, at least one-half of the area on a given side of the flat conductor should be exposed directly to the hydrogen coolant cross-flow. Placing a coolant channel on the opposite side to an insulating strip will enhance the cooling process and minimize the possible occurrence of thermal hot spots under the insulating strips. Ultimately, with this approach the width of the insulating strips will be determined primarily by the results of mechanical analysis and fluid dynamics of the hydrogen flow rather than thermal analysis.

Applying simple structural analysis for a beam under a distributed load and supported at both ends, the following formula is derived for the maximum separation "S" between each of the insulating spacers. The yield limit of the Al-Fe-Ce alloy was incorporated into this derivation.

$$S = SQR\{(1.2 \times 10^6 \times R \times Y)/(2 \times W \times V^2)\}$$

where
R=rotor radius (in)
Y=½ thickness of the conductor (in)
W=width of the conductor (in)
V=rotor tip speed (in/sec)

Doing the necessary conversions provides a value of "S" for the aluminum matrix of 0.14 cm. This may be too narrow to provide adequate coolant flow. However, if the structural support material consists of two thin bands of high-strength waspaloy nickel alloy sandwiching the flat conductor matrix, the separation could be increased to between 0.2 and 0.5 cm. The insulator strips would then have a width of between 0.2 and 0.5 cm and a thickness of 0.1 cm, which corresponds to the size of the coolant channel.

In performing the preliminary analysis, it was assumed that there was negligible insulation on the conductor matrix except for the insulator strips separating the coil turns. As stated above, it was assumed that one-half of the composite conductor outer surface is exposed to the cryogenic hydrogen coolant crossflow. With these assumptions, the thermal characteristics of the steady state behavior of the rotor can be calculated.

If, for the worst case, it is assumed that 10% of the coil module cross section consists of structural support material, then 25% of the cross section is allowed for the net cross section of the coolant cross sectional area separating the coil turns.

Net Cross Section of Coolant Cross Sectional Area:

$$0.25 \times (7.62\ cm \times 7.62\ cm) = 14.52\ cm^2$$

Cross Section of each Coolant Cross Sectional Area Separating the Coil Turns:

$$14.52\ cm^2/19\ turns = 7.64\ cm^2$$

Width of each Coolant Cross Sectional Area between Conductor Turns:

$$7.64\ cm^2/7.62\ cm = 0.100\ cm$$

Net Coolant Orifice between Conductor Turns:

$$\begin{aligned} \text{Net Orifice} &= (\text{Length of turn} \times \text{Principle gap})/2 \\ &= (78.36\ cm \times 0.100\ cm)/2 \\ &= 3.92\ cm^2 \end{aligned}$$

The effective net orifice of the coolant cross sectional areas depends on the fluid dynamic properties of the hydrogen and its static pressure as it is forced between the coil turns. The net orifice between each turn appears sufficient to permit effective coolant flow across the conductor surface.

The net heat transfer surface available in each rotor coil is 11,581 $cm^2$. By dividing the net ohmic power dissipated per coil by the net heat transfer surface/coil, we arrive at a good approximation of the ohmic heat load per coil which is 0.667 watts/$cm^2$. A heat load of less than 1 watt per square centimeter of surface area is readily manageable. The temperature rise in the worst case in the aluminum under these heat flux conditions would be 3° mK. However, at this very low temperature differential, the hydrogen flow requirement would be excessive, as a 3° K. temperature rise in the hydrogen would allow a more desirable cooling flow in the rotor of less than 1 kg/sec.

Selecting a Rotor Exciter

Figure 5:
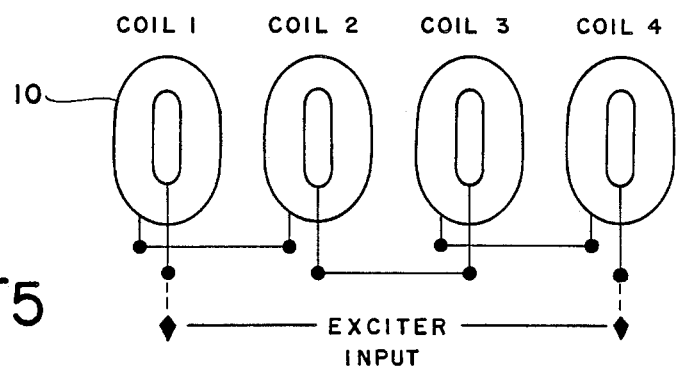
FIG. 5 is a diagram showing rotor coil electrical connections.

Since each coil has such low net resistance and to minimize the net current required from the exciter, all four coils are wired in series (see FIG. 5). Since the length of the rotor down leads are relatively short when compared to length of the windings in all four coils, the resistance of the down leads is ignored. The net resistance of the rotor, $R_{net}$, thus becomes the sum of the individual resistances of each coil. The net exciter current, $I_{net}$, becomes the same value in each coil.

$$\begin{aligned} R_{net} &= 4\ coils \times 4.73 \times 10^{-6}\ ohms/coil \\ &= 1.89 \times 10^{-5}\ ohms/rotor \end{aligned}$$

Knowing the net rotor resistance and the net exciter current drawn by the rotor, we can now calculate the net voltage, $V_R$, across the rotor down leads to be 0.76 volts.

Figure 6:
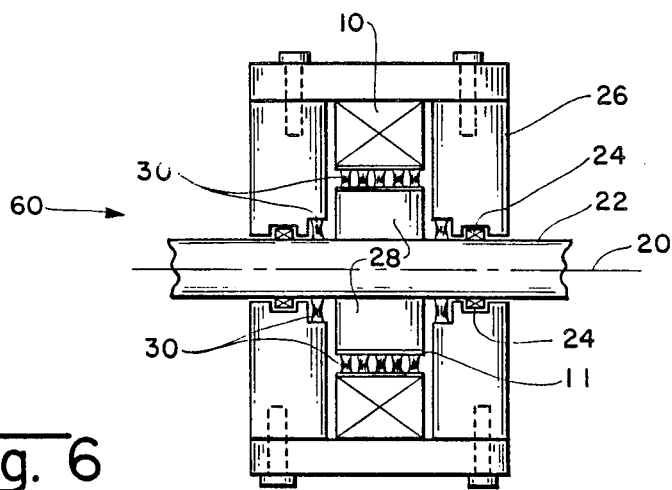
FIG. 6 is a diagram showing a homopolar type exciter.

Since the rotor is a low voltage high current driven device, it seems suitable to consider utilizing a homopolar generator mounted on the same generator drive shaft as the exciter current source (see FIG. 6). Doing so would introduce an additional voltage drop due to the contact resistance of the homopolar generator current collector brushes. Typically, this is on the order of 300 millivolts or less. If brushes are included to transfer the exciter current from the homopolar generator to the rotor down leads, there is an additional voltage drop of 300 millivolts. consequently, a third to almost one-half of the losses in the rotor exciter circuit could be attributable to the contact resistance of the current collector brushes of the homopolar generator and of the down leads.

Consequently, a worse case exciter circuit utilizing a homopolar generator as the exciter current source would have the following ranges of characteristics.

Output Voltage: 1.1 to 1.4 volts
Output Current: 40,300 to 40,500 amps
Output Power Rating: 44,300 to 65,700 watts Depending on the efficiency of the exciter current source, the exciter power requirements could be as high as 100 kilowatts. In the case of the rotor shaft mounted homopolar type exciter, this loss would be figured directly into the overall efficiency of the generator.

FIG. 6 represents a cross section cutaway showing the cylindrical symmetry about a horizontal axis 20 of the homopolar type exciter. The exciter comprises a crogenic generator drive shaft 22, roller bearings 24, a yoke/stator 26, a rotor 28, and collector brushes 30 contacting the conductor surfaces 11 of the coils 110.

Figure 7:
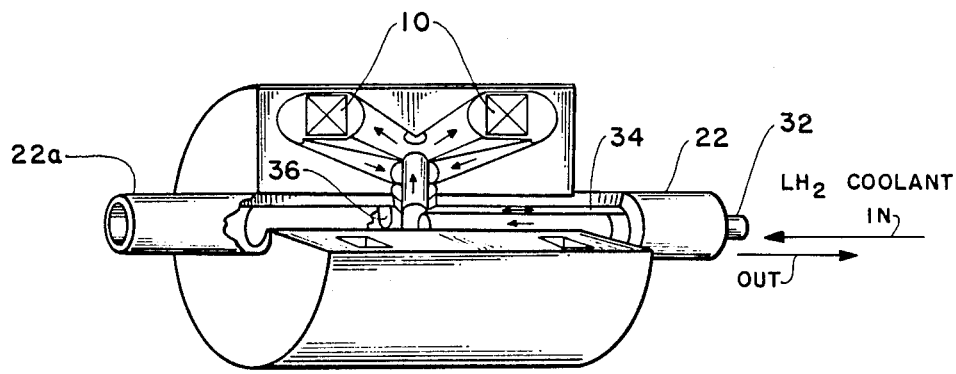
FIG. 7 is a pictorial view of a cryogenic generator rotor concept.

FIG. 7 illustrates the complete cryogenic rotor in a three-dimensional view, with a quarter section removed to show the coolant plumbing. One end 22a of the rotor drive shaft 22 is connected to a turbine driver, and at the other end cryogenic hydrogen coolant flows through an inner tube 32 which branches out to the channels 16, and then returns through an outer cylindrical passage 34. A cryogenic flow plug 36 blocks the flow of coolant beyond the branching channel to the coils.

Generator System Concept

Figure 8:
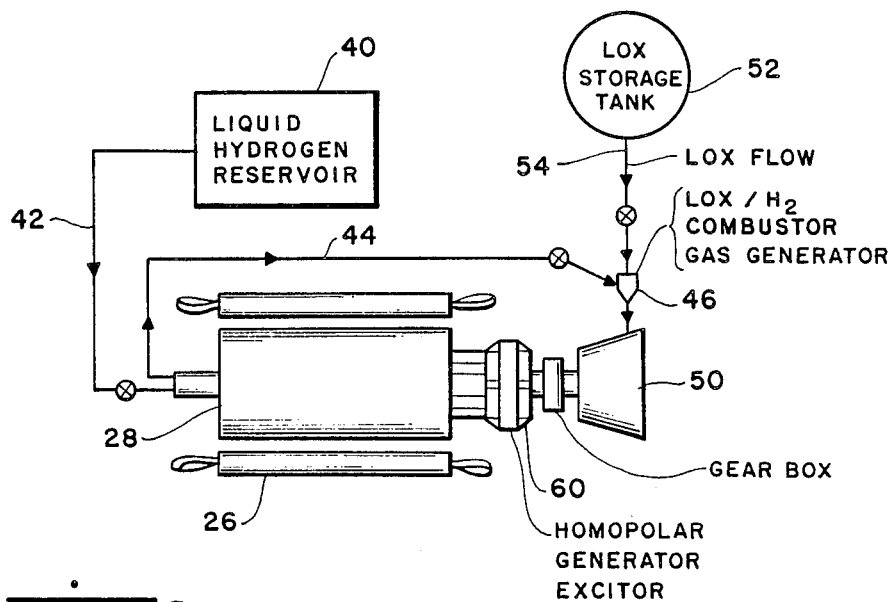
FIG. 8 is a symbolic diagram showing a crygenic generator system.

This generator rotor design was predicted upon the assumption that the generator would be part of a hydrogen fueled turbo-alternator prime power system. A possible system using the high current homopolar generator rotor exciter 60 of FIG. 6 is illustrated in FIG. 8. The hydrogen fuel, in its liquid state, would be stored in cryostats 40. Upon the system startup, the liquid hydrogen at 21° K. would be pumped from the cryostats through a line 42, circulated through the generator rotor 28 (perhaps including the stator 26) and then via a line 44 into the hydrogen combustor 46. The hot gases generated in the combustor would power the turbine assembly 50 that would be turning the generator. If this system were to be used on an aerospace platform, liquid oxygen from LOX storage tank 52 flowing through a line 54 would be combined in the combustor to sustain the combustion of the liquid hydrogen fuel.

Summary

Where there is a large reservoir of liquid hydrogen as fuel, it appears feasible to utilize a hydrogen cooled highly-conducting aluminum-wound generator rotor instead of a superconductor rotor. This would eliminate the risk of thermal instability associated with a superconductor rotor should one of its coils unexpectedly go "normal". Any number of mechanical and thermal stress combinations could cause this to happen. Also, this would save weight by eliminating the need for a liquid helium reservoir and the associated liquid helium refrigeration and liquefication equipment.

Since preheating the liquid hydrogen prior to its entry into the combustor enhances the combustion process, passing the liquid hydrogen through the generator beforehand would be a plus. In other words, this would increase the overall thermodynamic efficiency of the net power system.

It is understood that certain modifications to the invention as described may be made, as might occur to one with skill in the field of the invention, within the scope of the appended claims. Therefore, all embodiments contemplentated hereunder which achieve the objects of the present invention have not been shown in complete detail. Other embodiments may be developed without departing from the scope of the appended claims.

What is claimed is:

1. A cryogenic but not superconducting wound rotor for a lightweight, high-voltage generator, comprising:
   rotor coils each having a plurality of turns of a conductor comprising high-purity aluminum filaments embedded in an aluminum based alloy matrix with diffusionless alloying elements, with insulator spacers between the turns to form coolant flow through channels;
   wherein said conductor is flat having a larger dimension in width across the turns and a relatively thin dimension in the stacking direction, with a single turn per layer, and said insulator spacers are across the turns perpendicular to the direction of current flow and to the stacking direction, placed with the coolant channels opposite to insulator spacers between turns, said insulator spacers being the only insulation for the conductor between turns.

2. A rotor according to claim 1, in which said aluminum filaments are at least 99.99% pure, with no significant amount of said alloying elements.

3. A rotor according to claim 2, in which said alloy comprises an aluminum-iron-cerium alloy matrix.

4. A generator comprising a cryogenic but not superconducting wound rotor, bearings, stator conductor, external magnetic flux shield means, and excitation mechanisms which are constructed (with no iron) so as to be completely cooled by hydrogen, with no armature shield between the rotor and stator conductor, thereby minimizing the gap distance;
   wherein the rotor comprises rotor coils each having a plurality of turns of a conductor comprising high-purity aluminum filaments embedded in an aluminum based alloy matrix with diffusionless alloying elements, with insulator spacers between the turns to form coolant flow through channels;
   wherein said aluminum filaments are at least 99.99% pure with no significant amount of said alloying elements, said alloy comprises an aluminum-iron-cerium alloy matrix, and said conductor is flat having a larger dimension in width across the turns and a relatively thin dimension in the stacking direction, with a single turn per layer, and said insulator spacers are across the turns perpendicular to the direction of current flow and to the stacking direction, placed with the coolant channels opposite to insulator spacers between turns, there being negligible insulation on the conductor except for said insulator spacers, and wherein said external magnetic flux shield means is aluminum.

5. A generator according to claim 4, further including a homopolar type exciter mounted on the same drive shaft as said rotor and electrically connected via a circuit with brushes to supply exciter current to said rotor coils in series.

* * * * *